Aug. 30, 1955  B. E. BERAN  2,716,561
VEHICLE SAFETY BELT ATTACHMENT
Filed March 30, 1953  2 Sheets—Sheet 1
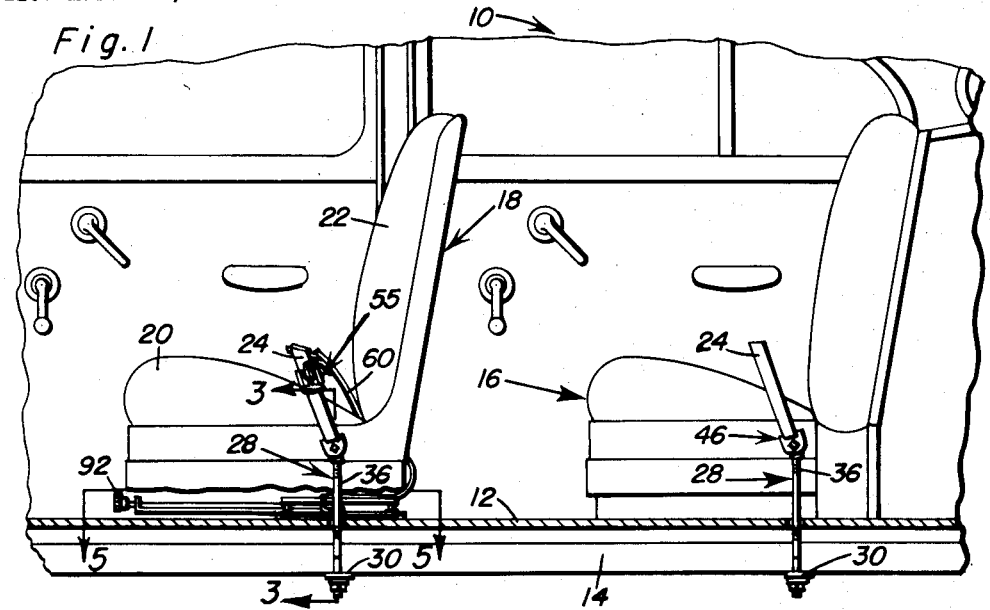
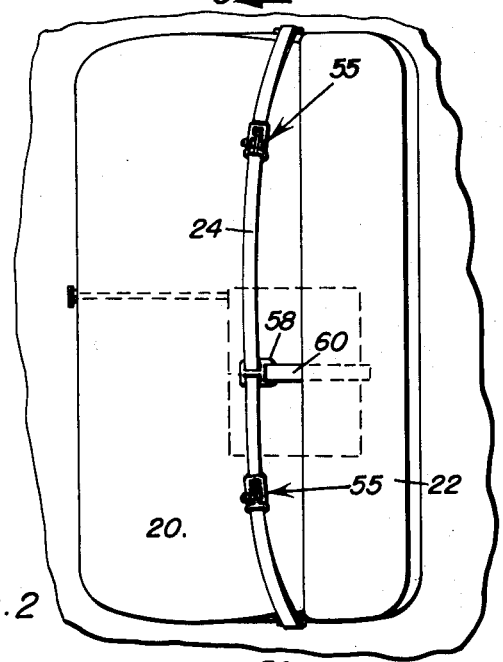
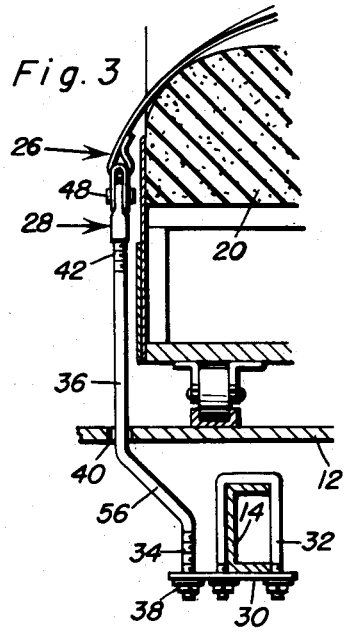
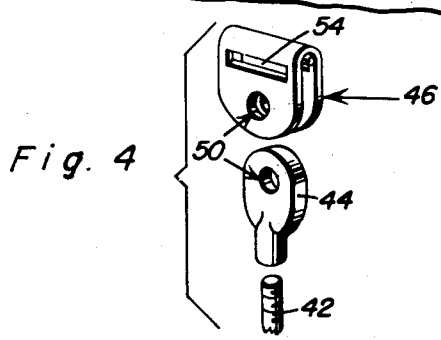
Ben E. Beran
INVENTOR.
BY *Clarence A. O'Brien*
*and Harvey B. Jackson*
Attorneys

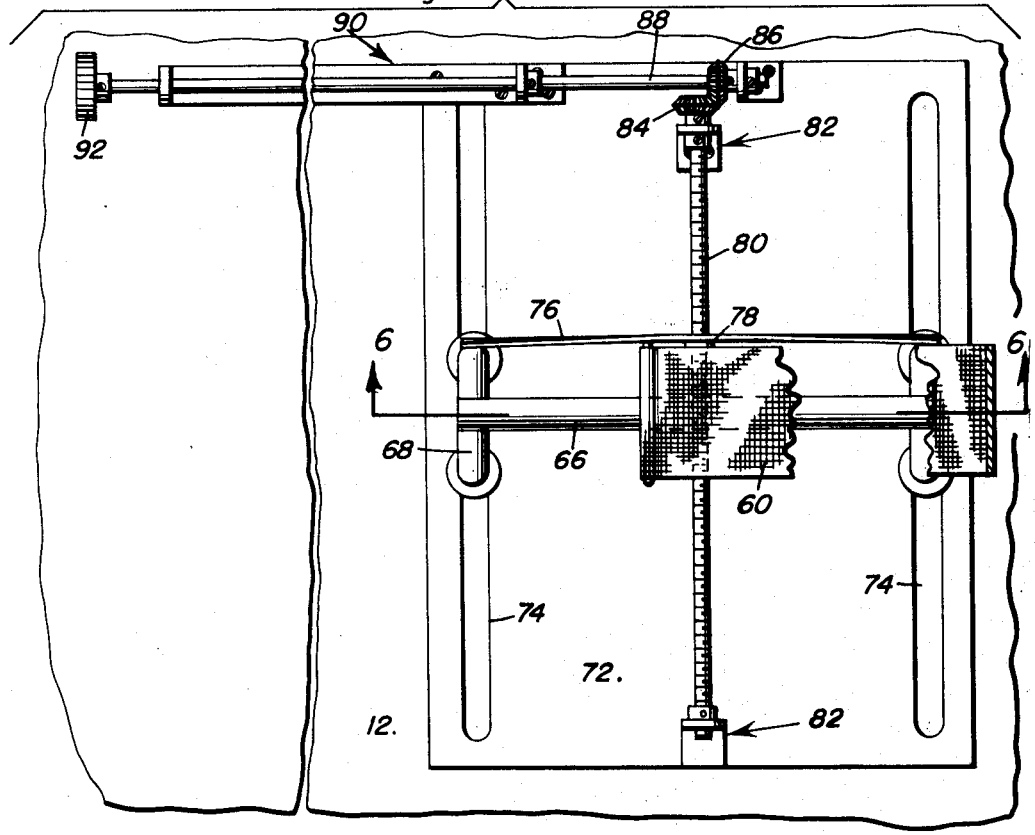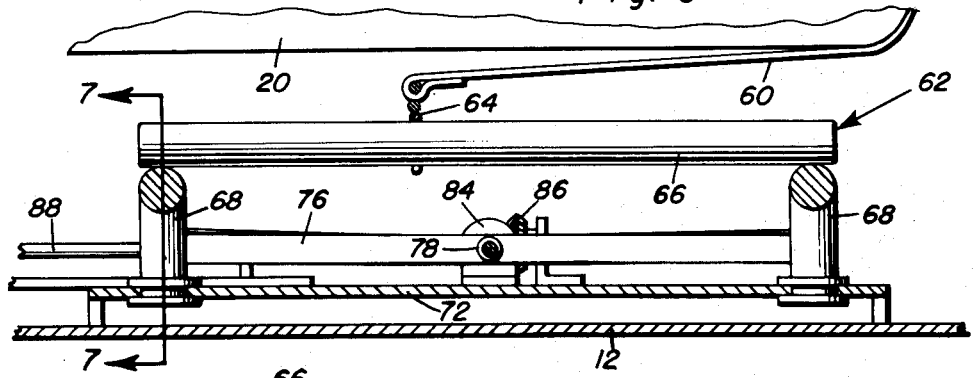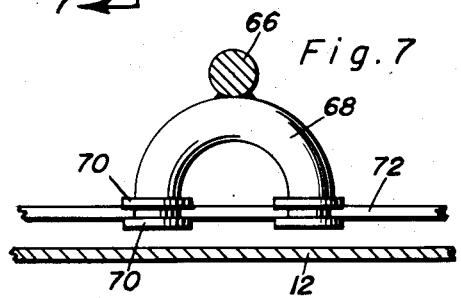

United States Patent Office 2,716,561
Patented Aug. 30, 1955

2,716,561

VEHICLE SAFETY BELT ATTACHMENT

Ben E. Beran, Hebron, Nebr.

Application March 30, 1953, Serial No. 345,460

5 Claims. (Cl. 280—150)

This invention relates to vehicle attachments and more particularly to safety belt devices for preventing injury to occupants of a vehicle in the event of a collision or the like.

It has been apparent for some years that the primary cause of death and injury in traffic accidents is due to the fact that passengers of the vehicles involved are thrown forwardly from their seats into engagement with the windshield or other portion of the vehicle and often completely out of the vehicle which causes the actual injury to the person. One extremely effective means for preventing such injuries is to provide the vehicle with safety belts which will prevent the passengers from being thrown from their seats during collision and in recent years, due to the popularity of automobile racing where such devices are mandatory, numerous types of safety belt attachments have been marketed for use by ordinary passenger vehicles. However, these devices have not met with wide public approval primarily because they have to be adjusted for proper fit everytime the vehicle seat is moved backwards or forward to accommodate drivers of various height and leg reach. Since the general public will not readily accept an attachment of this nature unless it requires the absolute minimum of inconvenience, the means for providing such a safety belt attachment has been urgent.

It is therefore a primary object of this invention to provide a safety belt attachment for vehicle seats which will require a minimum of adjustment incident to its use.

Another object of this invention is to provide a safety belt attachment for vehicles which will be maintained in snug engagement with occupants of the vehicle in any position of the seat.

Another object of the invention is to provide an improved means for securing safety belts to vehicles, such means being readily adaptable to substantially any make or model of vehicle requiring a minimum of effort in installation.

Another object of this invention is to provide a safety belt attachment for vehicles which incorporates a tensioning means which is transversely movable to provide the most comfortable positioning of the attachment of the passengers of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical section through a portion of the vehicle provided with the novel safety belt attachment;

Figure 2 is a plan view of a front seat of a vehicle provided with the novel belt attachment;

Figure 3 is a vertical section taken substantially along the plane of section line 3—3 of Figure 1 and showing the manner of attachment of one end of the restraining belt on enlarged scale;

Figure 4 is an exploded perspective view of a portion of one of the attaching brackets;

Figure 5 is a horizontal section taken substantially along the plane of section line 5—5 of Figure 1 and showing details of the tensioning carriage on enlarged scale;

Figure 6 is an enlarged vertical section taken substantially along the plane of line 6—6 of Figure 5 showing further details of the tensioning carriage assembly; and Figure 7 is a vertical section taken substantially along the plane of section line 7—7 of Figure 6 showing one portion of the tensioning carriage and its manner of atachment to its mounting plate.

Referring now more particularly to Figures 1–3, reference numeral 10 indicates generally a portion of a passenger vehicle including a floor 12 and main frame members 14. A rear seat 16 is rigidly secured to the floor and a front seat 18, including a cushion portion 20, is mounted for longitudinal movement on the floor, as is well known. The front seat is also provided with a back rest portion 22, as is the rear seat.

Considering first the attachment as applied to the front seat, the safety belt device comprises a main restraining portion 24 which extends across the seat and terminates at its opposite ends in the loops 26 by means of which the opposite ends of the belt are secured to the bracket assemblies 28. Each of the mounting brackets is secured to a corresponding frame rail of the vehicle by means of the plates 30, fastened thereto by means of the U-bolts 32 and which project laterally beyond one side of the frame rails to present apertured ears through which one end 34 of an angulated rod member 36 is extended and secured by means of the nuts 38. The rod member extends upwardly through an aperture 40 in the floor of the vehicle to a point adjacent one side of the vehicle seat and presents at its upper end a threaded portion 42 upon which an eye 44 is secured, see Figure 4. A belt receiving attaching lug 46 is pivotally secured to the eye by means of the pivot pin 48 which extends through corresponding openings 50 in the lug and eye. The looped portions 26 of the belt are disposed through slots 54 in the lugs as will be apparent.

It will be noted that the angulated portion 56 of each of the attaching rods may be variously disposed by bending to adapt the bracket assembly to various types and makes of vehicles currently in production and use, and that the point of securement of the rods to the frame, taken in conjunction with the particular point at which the apertures 40 are provided, will enable the person installing the assembly to adapt this construction to substantially all makes and models of currently manufactured vehicles.

Referring now more particularly to Figure 1, it will be appreciated that the belt is initially adjusted to proper length by means of the conventional take-up on attaching hook assemblies 55. To provide additional support for persons using the belt against forward movement in the event of collision, a sliding head 58 is slidably secured substantially medially of the belt portion 24 and presents an attaching loop 58 to which one end of a tensioning belt 60 is attached. The tensioning belt extends therefrom between the seat cushion 20 and the back rest 22 and thence beneath the seat cushion wherein it is attached to a carriage assembly 62, see Figures 5–7. The manner of attachment is by a ring 64 engaged upon the carriage rod 66 to cam and lock thereagainst when the tensioning belt is pulled.

The carriage rod is suitably secured at opposite ends to the inverted U-shaped members 68 which are provided at their free ends with flanges 70 which engage against opposite surfaces of a mounting plate 72 secured to the floor of a vehicle and the elongated slots 74 in the plate member allow the carriage rod and the U-shaped members to be slidably guided along the plate transversely of the vehicle. A bar 76 is secured at opposite ends to the U-shaped members and extends therebetween wherein it is provided substantially medially thereof with a threaded boss 78 through which the screw shaft 80 engages. The screw shaft is mounted against longitudinal displacement on the plate 72 by means of the bracket assemblies 82 and the shaft has secured at one end a gear 84 which engages with pinion 86 on the actuator shaft 88 to impart rotational movement to the shaft and consequent lateral shifting of the carriage assembly along the mounting plate. The actuator shaft is journaled in the bracket assembly 90 and is provided at its free end with a manually actuated knob 92 readily accessible to the occupants of the vehicle.

The purpose of the lateral shifting of the carriage assembly is to position the tensioning belt 60 relative to the occupants of the front seat so as to afford them the most comfortable arrangement of the safety belt attachment, it being apparent that the tensioning belt will be shifted away from the driver between the two passengers of the vehicle should three persons be sitting in the front seat rather than two, thus affording a maximum of resistance to inertia forces at the most critical point.

In the rear seat mounting, all of the component parts are identical to those previously described with the exception that the tensioning belt and its related assemblies is not provided since the passengers disposed in the rear seat of the vehicle are less subject to injury during collision than are those of the front seat.

In ordinary constructions where the retaining belt is secured to the seat, such an attachment does not afford the positive protection necessary since, with this arrangement, the seats will frequently be torn bodily loose from the floor of the vehicle and the occupants thereof thrown against the windshield or the like. With a safety belt attached securely to the frame, the problem heretofore encountered was that the matter of installation was difficult and expensive and therefore did not meet with general public acceptance. With the instant construction, however, the attachment is quickly and easily installed on any vehicle and entails a negligible installation expense.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims:

What is claimed as new is as follows:

1. In combination with a vehicle having a frame and a seat, means fastened to the frame at each side of the seat and secured to opposite ends of a flexible restrainer for holding a person from displacement from the seat, means for maintaining said restrainer in snug engagement with a person in the seat, said last means comprising a flexible member secured at one end substantially medially of said restrainer and secured at its other end to said frame, said flexible member being slidably secured at one end to said restrainer, and carriage means transversely movably secured to said frame to which the opposite end of said flexible member is secured.

2. In combination with a vehicle having a frame and a seat, a restrainer extending across said seat for holding a person from displacement under the action of an inertia force, means for securing the opposite ends of said restrainer to said frame, means for securing the central portion of said restrainer to said frame, said last means comprising a flexible member secured to said restrainer and extending therefrom around the rear portion of the seat to a point of attachment to the frame below said seat, said flexible member being slidably secured at one end to said restrainer, and carriage means transversely movably secured to said frame to which the opposite end of said flexible member is secured.

3. In combination with a vehicle having a frame and a seat, a restrainer extending across said seat for holding a person from displacement from said seat, means for securing the opposite ends of said restrainer to said frame, means for maintaining said restrainer in snug engagement with a person in said seat, said last means comprising a flexible member slidably connected to said restrainer, a carriage movable transversely of said vehicle and means on said member for securing the latter to said carriage.

4. The combination of claim 3 wherein a screw shaft is provided on said vehicle and said carriage is provided with a threaded portion engageable with said screw, means for rotating said screw.

5. The combination of claim 3 wherein said carriage comprises a rod disposed longitudinally of the vehicle, and the last mentioned means comprises a ring encompassing said rod.

References Cited in the file of this patent
UNITED STATES PATENTS

| | | |
|---|---|---|
| 2,263,348 | Barros | Nov. 18, 1941 |
| 2,267,373 | Carlisle | Dec. 23, 1941 |
| 2,280,694 | Embree et al. | Apr. 21, 1942 |
| 2,365,625 | Carlisle | Dec. 19, 1944 |